United States Patent [19]

Reitter

[11] 3,776,483

[45] Dec. 4, 1973

[54] RECEPTACLE FOR A ROLL, REEL OR CASSETTE OF PHOTOGRAPHIC FILM

[75] Inventor: George M. Reitter, Rochester, N.Y.

[73] Assignee: Eastman Kodak Company, Rochester, N.Y.

[22] Filed: May 25, 1972

[21] Appl. No.: 256,664

[52] U.S. Cl. .................. 242/71.1, 206/52 F, 352/78
[51] Int. Cl. ............................................. G03b 23/04
[58] Field of Search ...................... 242/71.1, 197; 206/52 F; 95/31 DS, 31 PF; 352/75, 76, 77, 78

[56] References Cited
UNITED STATES PATENTS

| | | | |
|---|---|---|---|
| 3,627,227 | 12/1971 | Foor | 242/197 |
| 3,603,528 | 9/1971 | Kingsley | 242/197 |

Primary Examiner—George F. Mautz
Assistant Examiner—Edward J. McCarthy
Attorney—Robert W. Hampton et al.

[57] ABSTRACT

A receptacle or magazine comprises individual compartments in each of which a discrete strip of photographic film can be selectively positioned as a roll per se or as a roll contained by any one of a number of types of carriers. Each compartment receives a selected type of film in accordance with its carrier format. The film is dispersed through a withdrawal slot for introduction into processing apparatus when the receptacle is mounted thereon. The side of the casing containing the withdrawal slot is provided with mounting pins which permit the receptacle to be mounted relative to an entry slot for the processing apparatus. An indexing element on the processing apparatus is aligned with a scale on the receptacle to position the latter relative to the entry slot in accordance with the width of the film contained in the receptacle.

14 Claims, 8 Drawing Figures

PATENTED DEC 4 1973 3,776,483

RECEPTACLE FOR A ROLL, REEL OR CASSETTE OF PHOTOGRAPHIC FILM

FIELD OF THE INVENTION

The invention relates to a receptacle for a discrete strip of photographic film and, more particularly, to such a strip of film that is in the form of a roll per se, or a roll contained on a reel or in a cassette or magazine and in any such form can be selectively contained in the same receptacle.

DESCRIPTION OF THE PRIOR ART

As is well known, photographic film that has been exposed must subsequently be processed. The film is made available in a number of different forms for use in different types of cameras. For example, the film can be in the form of a roll in a cartridge, can be contained on a reel, or can be a roll comprising loose convolutions of film contained in a cassette. Such strips of film are received in these various forms for processing. In some film processing apparatus, the film strip is threaded into the apparatus as discrete strips. In other types of film processing apparatus, in which the operation is continuous, the strips of film of the same or various widths are spliced together by suitable mechanical means to present a continuous strip for operation. When the film strips are spliced together for continuous processing, the cartridge or cassette containing the film must be opened. Such opening, as well as handling, of the cartridge or cassette must be in total darkness to eliminate fogging of the exposed film. Accordingly, the operator, who is responsible for maintaining continuous operation of the film processing apparatus, must perform these operations in total darkness. At the same time, the operator must associate the type of film that is being processed with that being presented for processing. In other words, the operator must be able to recognize not only film size but also the type of film (black and white, color, etc.).

SUMMARY OF THE INVENTION

It is an object of the invention to provide a light tight receptacle that will accommodate for use in conjunction with processing apparatus a strip of photographic film that is in roll form and of different widths.

It is another object of the invention to provide a light tight receptacle within which a discrete strip of photographic film can be selectively contained as a roll per se or as a roll carried on a reel or contained in a magazine or cassette and can be used to introduce such film into a film processor.

It is another object of the invention to provide a light tight receptacle containing a discrete strip of photographic film for processing with means for positioning the receptacle relative to the entry slot of a self-threading, continuously operating film processor in accordance with the width of the film in the receptacle.

It is still a further object of the invention to provide a light tight receptacle for a discrete strip of photographic film that will not only accommodate various sizes and formats of film, but which can be readily loaded with film under ordinary light conditions.

Other objects and advantages of the invention will be apparent to those skilled in the art by the description which follows.

The above objects and advantages of the invention are attained by a receptacle or magazine having individual compartments in each of which a discrete strip of photographic film can be selectively positioned as a roll per se or as a roll contained by any one of a number of types of carriers. Each compartment receives a selected type of film in accordance with its carrier format. The receptacle comprises a generally hollow casing having an open end and one end thereof provided with a pair of spaced slots. A compartment is arranged adjacent the one end and the open end and is provided with an opening that is aligned with the open end for receiving a strip of film in the form of a roll per se or a roll contained in a cartridge. The compartment is provided with a discharge slot, which is adjacent one of the pairs of slots, through which the strip of film can be withdrawn. The casing is provided with a plurality of rolls rotatably mounted within the casing and opposite the open end for rotatably supporting a reel having a strip of film wound thereon. The reel is inserted in the casing through the open end, the strip of film being withdrawn through the other of the pair of slots. The casing is also provided with means for supporting a cassette containing a strip of film in roll form. The cassette is inserted into the casing through the open end, and the strip of film is withdrawn through the one of the pair of slots adjacent the discharge slot. A first cover is pivotally mounted on the casing and normally covers the open end. When the first cover is in an open position, the compartment and the interior of the casing are exposed so that any one form of the film strip can be selectively inserted into either the compartment or the casing. A second cover is pivotally mounted on the casing, normally overlying the one end, and forms therewith a withdrawal slot for the strip of film. This second cover is provided with a recess so as to provide a common passageway for the strip of film being withdrawn through any one of the slots, the film being dispersed through a withdrawal slot for introduction into the processing apparatus when the receptacle is mounted thereon. The side of the casing containing the withdrawal slot is provided with mounting pins which permit the receptacle to be mounted relative to the entry slot for the processing apparatus. An indexing element on the processing apparatus is aligned with a scale on the receptacle to position the latter relative to the entry slot in accordance with the width of the film contained in the receptacle. The casing can selectively accommodate film reels of different sizes which contain 16mm film strips from 25 to 200 feet in length, as well as a cassette containing a film strip of 8mm or 16mm width. The roll film selectively contained in the compartment can be 8, 16 or 35mm or a cartridge containing 35mm film. It should be understood that a roll of film is meant to include one contained within a cartridge or removed therefrom and positioned in the compartment. Also, cassette is to be considered synonymous with magazine.

DESCRIPTION OF THE DRAWINGS

Reference is now made to the accompanying drawings wherein like reference numerals and characters designate like parts and wherein.

DESCRIPTION OF THE PREFERRED EMBODIMENT

Figure 1:
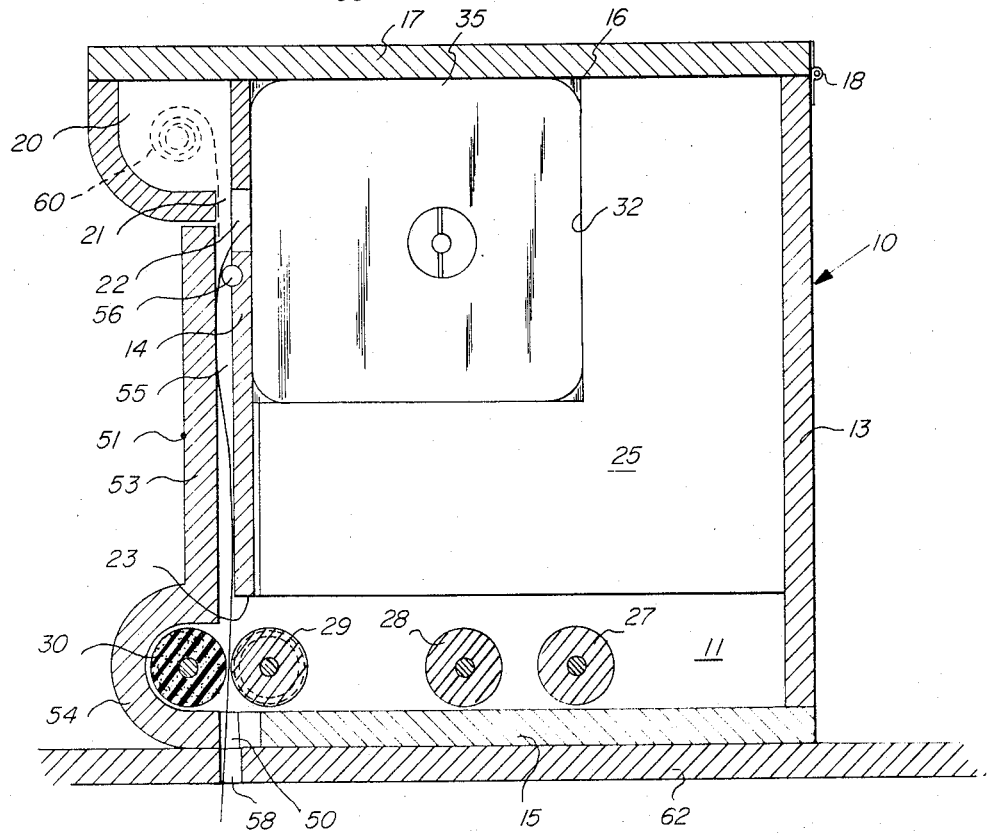
FIG. 1 is a vertical sectional view through a receptacle in accordance with the invention and showing a cassette of film contained within the casing, and in dotted lines, a roll of film contained within the compartment.

The receptacle or magazine 10, as shown in FIG. 1, can be fabricated from a number of individual pieces of material fastened together with screws or, without covers, as a single element molded and formed from a plastic material. Such a single element with the necessary covers will provide a completely enclosed light tight receptacle or magazine. The magazine 10 is provided with spaced side walls 11 and 12 which are joined by end walls 13 and 14 and a bottom wall 15. With such a structure, an open end 16 is provided and is normally covered with a member 17 that is pivotally mounted at 18 to the end wall 13. The magazine 10 also includes a compartment 20 that is arranged adjacent the open end 16 and one end wall or, more specifically, the side wall 14, as seen in FIG. 1. The compartment 20 is provided with a discharge slot 21 that is arranged adjacent a first slot 22 in the end wall 14. The wall 14 is also provided with a second slot 23 for a purpose to be defined hereinafter.

Means for supporting a film cassette or magazine within receptacle 10 comprises a pair of L-shaped plate members 25, 26, each of which is secured to a respective interior surface of the walls 11 and 12. It will be noted that the plate members 25 and 26 do not extend to the bottom wall 15 but are spaced therefrom, as well as from a plurality of rolls 27–30 rotatably mounted adjacent the bottom wall 15, see FIG. 1. The shape of plate members 25 and 26 is such that a recess 32, 33 is formed relative to each of the side walls 11, 12. The size of this recess is such that when a cassette 35 is inserted through open end 16 with cover member 17 in an open position, it will be supported and retained by the edges of the plates 25 and 26 in cooperation with wall 14 and cover member 17 when the latter is returned to its closed position.

Figure 4:
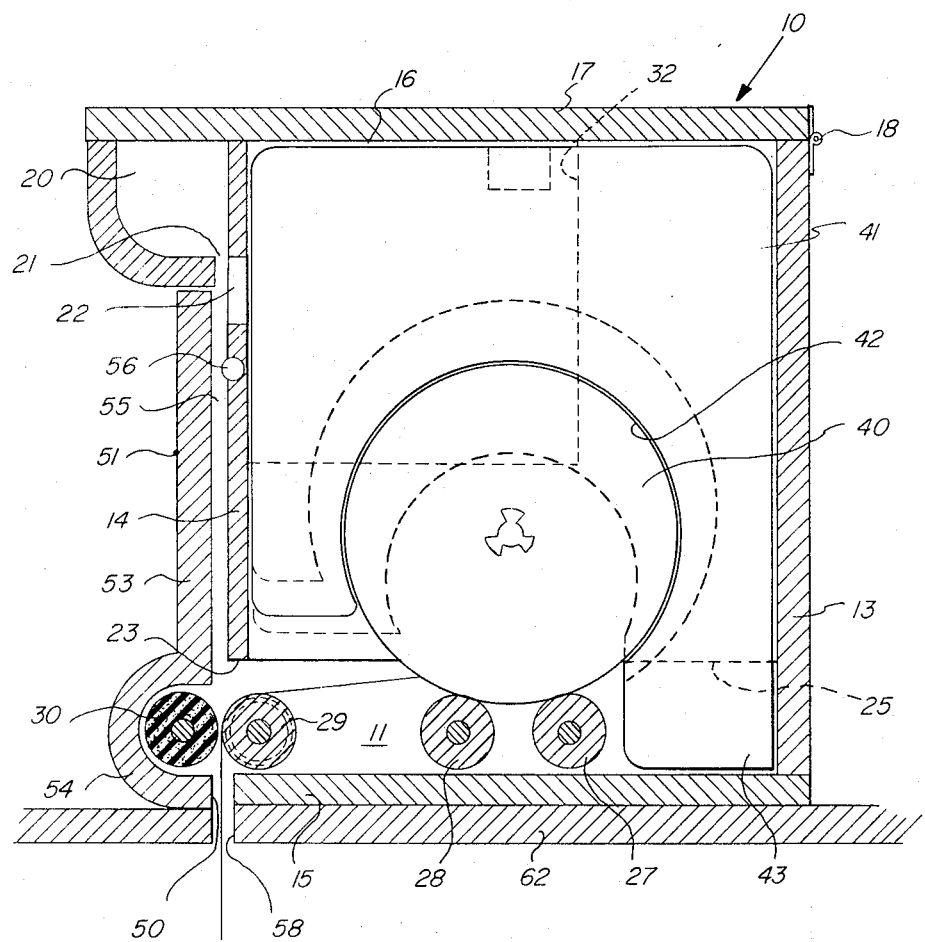
FIG. 4 is a vertical sectional view through the receptacle, similar to that shown in FIG. 1, and showing particularly the arrangement by which a reel of film is retained within the casing.

Means for rotatably supporting a reel of film within magazine 10 comprises rolls 27 and 28 which are rotatably mounted in spaced relation as generally shown in FIGS. 1 and 4. The spacing of the rolls is such that they will rotatably support a reel 40 when in engagement with the peripheral edges of the spaced flanges of the reel. With reference to FIG. 4, a block 41 is utilized in conjunction with rolls 27 and 28 to maintain reel 40 in position in casing 10 within reasonable limits and without interferring with its freedom to rotate. The block 41 is provided with an arcuate cut-out portion 42 which will encompass at least 180° of the reel flanges. The width of the block 41 is such that it can be inserted through the open end 16 without interference with the plates 25 and 26. A number of such blocks can be provided to accommodate reels of film of different footage. In each case, the arcuate portion 42 will correspond generally to the diameter of the reel and the location relative to the bottom wall 15 will be maintained by a leg 43 which extends vertically downward toward wall 15 and is to the right of reel 40, as seen in FIG. 4.

Figure 2:
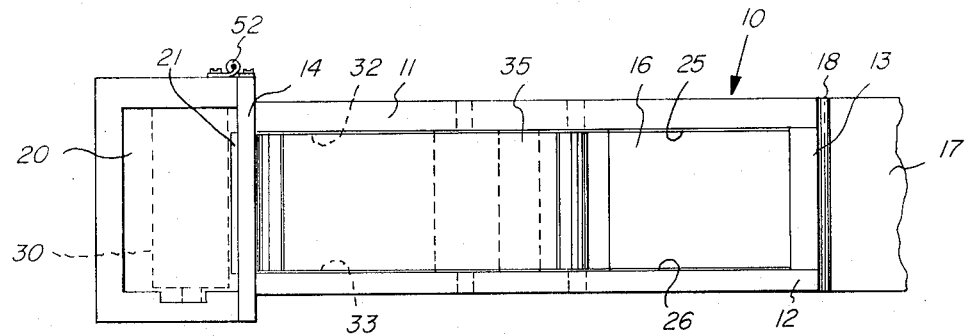
FIG. 2 is a plan view of the receptacle shown in FIG. 1 with the cover in an open position to more clearly show the internal structure of the receptacle as well as the relation of the casing and compartment to the open end.

The rolls 29 and 30 are rotatably mounted adjacent the withdrawal slot 50 that is formed by the bottom wall 15 and the end cover 51. The end cover 51, which is pivotally mounted on casing 10 at 52, see FIG. 2, comprises a flat portion 53 and a semicircular extension 54 which encompasses the roll 30, which, preferably, is solid rubber or carries a rubber sleeve. The end cover 51 is spaced from the wall 14 and this space 55 provides a common passageway relative to slots 21, 22 and 23 and withdrawal slot 50.

Figure 3:
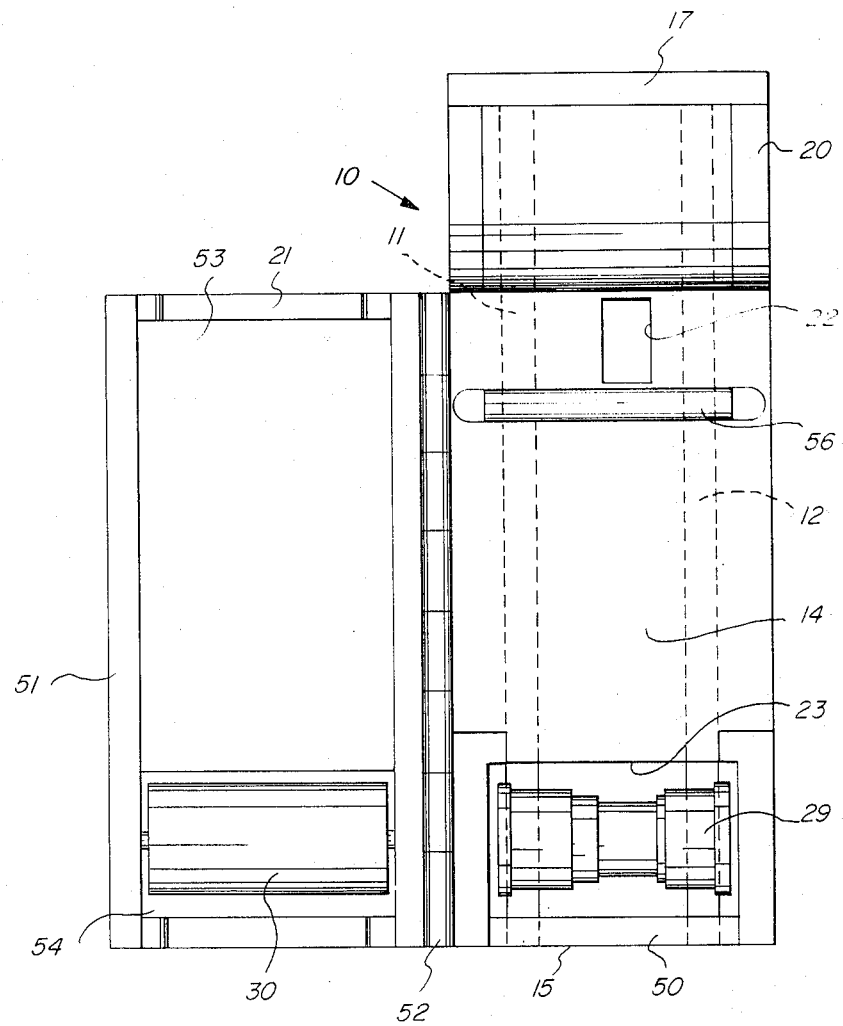
FIG. 3 is a side elevational view with the end cover in an open position and showing the relation of the several discharge slots to the withdrawal slot.

The magazine 10 is made light tight by adhering a narrow band of plush or felt along the outer surfaces of covers 17 and 53 that engage magazine 10, or along the corresponding edges of magazine 10. In order to maintain the film strip in the space 55 without rubbing against wall 14 or portion 53 during withdrawal, a fixed plastic member or a roller 56 is arranged in wall 14 below slot 22, as shown in FIGS. 1 and 3.

Preferably, the magazine is positioned relative to an entry slot 58 in the processing apparatus before loading. However, it can first be loaded and then positioned relative to the slot 58. With magazine 10 positioned relative to slot 58 and the cover 17 in an open position, a roll of film or a roll of film contained in a cartridge can be positioned in compartment 20. The end of the film is first threaded through slot 21, then through space 55, between rolls 29, 30 and through slot 50 and into slot 58. The cover 17 is then closed. When the magazine 10 is first loaded, the end cover 51 is also in an open position. The film can then be drawn along the face of wall 14 and placed in engagement with roll 29 with the end thereof extending beyond the bottom wall 15. The covers 17 and 51 are then closed and the magazine positioned relative to slot 58.

With magazine 10 positioned relative to slot 58 and the cover 17 in an open position, the end of the film extending from the cassette 35 is first threaded through slot 22 into space 55, between roll 29 and 30 and through slot 50 and into slot 58. The cassette is then inserted into the open end 16 and is retained by the recesses 32, 33 formed by plates 25, 26. The end of the film strip extending into the apparatus will be automatically picked up for threading through the processor. When the cover 17 is closed, the cassette 35 will be retained in the recesses 32, 33, as shown in FIG. 1. Substantially the same procedure is followed when the magazine 10 is first loaded. In this case, the cover 51 can be opened and the film loaded or threaded as described above.

In order to load a reel 40 into the casing 10, again assuming the magazine 10 is positioned on the processor and the cover 17 is in an open position, the proper block 41 is chosen so as to have an arcuate opening 42 that will encompass and correspond to the size of the reel to be processed. The end of the film strip is first threaded through slot 23, between rolls 29 and 30, and through slot 50 into slot 58. The block and reel are then inserted into the open end 16. When the cover 17 is closed, it will retain the block 41 and reel 40 within casing 10 with the reel flanges freely and rotatably supported by the rolls 27 and 28. Substantially the same procedure as described above is followed when the magazine 10 is first loaded.

Figure 6:
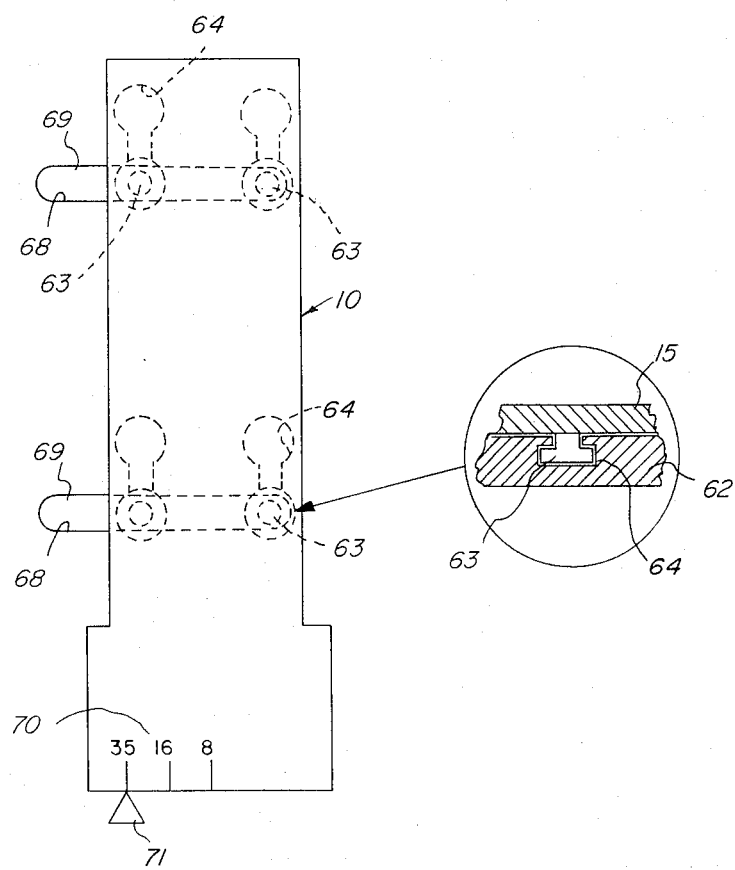
FIG. 6 is a diagrammatic view showing means by which the receptacle is mounted on the processing apparatus and the manner in which the location of the receptacle relative to the entry slot is established by means of an indexing arrangement.

In each of the cases described above, the end of the film strip will extend beyond wall 15 when the magazine 10 is first loaded. With the end of the film extending from the magazine 10, the magazine is then positioned on the processing apparatus and relative to slot 58 into which the end of the film extends for pick up by the automatic film threading system in the processing apparatus. The magazine 10 is positioned on wall 62 by inserting the pins 63 mounted on the wall 15 into the spaced, key slot openings 64 in the wall 62 of the processing apparatus. As shown in FIG. 6, the magazine can be lowered in slots 64 until each pair of pins 63 comes to rest against its respective edge 68 of a pair of elongated, horizontal slots 69. In this position, the magazine is moved laterally to the right or left until the one of the graduations 70 carried by the wall 13 and corresponding to the film width is aligned with an index mark 71 on the wall 62. When the magazine 10 remains in position on the processor, it must be shifted laterally with any change in film width before the magazine is loaded with such film. This will permit immediate pickup of the end fed into slot 58 by the processor threading system.

Figure 5A:
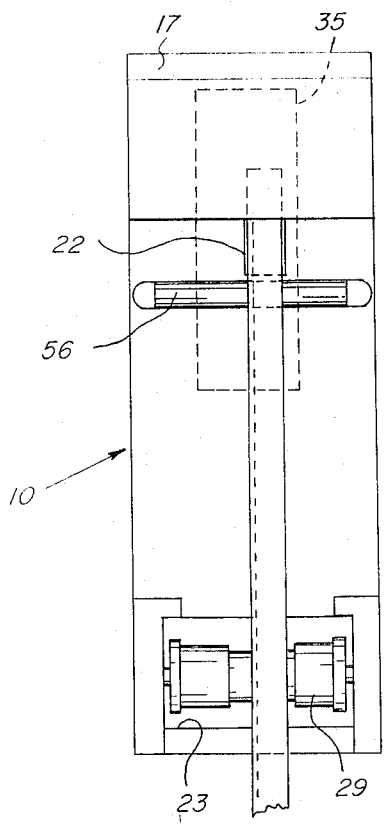
FIGS. 5a–5c comprise a number of similar end views showing particularly the transverse location of each film strip of different width relative to the receptacle and the withdrawal slot.
Figure 5B:
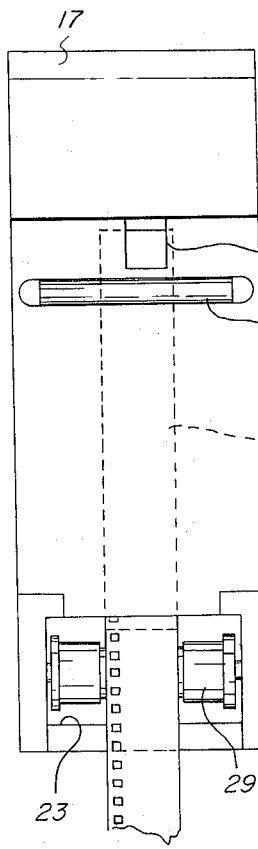
Figure 5C:
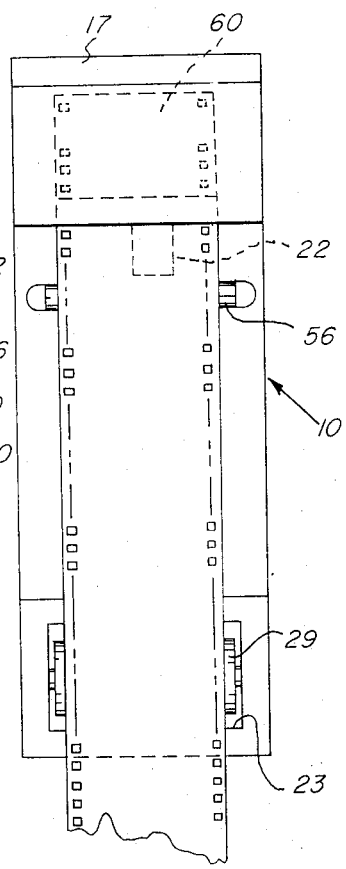

With reference to FIG. 5, it will be noted that the film irrespective of its width [8mm (FIG. 5a), 16mm (FIG. 5b), and 35mm (FIG. 5c)] is located generally centrally with respect to the withdrawal slot 50. As a result, the spacing of the graduations 70 indicating the various film widths are not necessarily positioned relative to each other in accordance with the true dimension that is necessary to obtain an exact central location of the film strip. This should be evident from the relative space between the 16mm and 35mm line designations, which are spaced substantially the same as the lines indicating 8mm and 16mm.

As stated above, the magazine structure disclosed herein provides for introducing exposed strips of photographic film into a processor under dark or normal light operating conditions. In addition, a single magazine can be utilized for various widths and formats of film without requiring a separate magazine for each such type of film strip carrier. It will be obvious to one skilled in the art that the magazine can take forms other than those disclosed and described and can be used for strip materials other than photographic films. In the latter case, the magazine need not be made light tight.

This invention has been described in detail with particular reference to preferred embodiments thereof, but it will be understood that variations and modifications can be effected within the spirit and scope of the invention.

I claim:

1. A magazine for receiving a discrete strip of photographic film selectively contained therein as a roll, on a reel and in a cassette for introduction of said strip into a film handling device, comprising:
    a generally hollow casing having an open end and an end wall provided with a first slot and with a second slot spaced from said first slot;
    a compartment adjacent said one end wall and said open end and having an opening generally aligned with said open end for receiving said roll of film and having a discharge slot adjacent said first slot through which the strip of film can be withdrawn;
    first means arranged within said casing comprising a plurality of rolls rotatably mounted generally opposite said open end for rotatably supporting said reel of film, said reel being insertable in said casing through said open end with the strip of film being withdrawable through said second slot;
    second means arranged within said casing for supporting said cassette, said cassette being insertable into said casing through said open end with the strip of film being withdrawable through said first slot;
    first cover means pivotally mounted on said casing and movable between positions in which said open end and opening are normally covered and uncovered for selective insertion into one of said casing and said compartment of said roll, said reel and said cassette; and
    second cover means pivotally mounted on said casing and movable between an open position and a position normally overlying said one end wall to form therewith a withdrawal slot for the strip of film in an other wall of said casing opposite said open end and for providing a common passage for the strip of film being withdrawn through any one of said first slot, second slot and discharge slot for dispensing the same through said withdrawal slot.

2. A magazine in accordance with claim 1 wherein said casing comprises spaced, generally rectangular side walls and said one end wall and said open end are generally perpendicular to one another and to said side walls.

3. A magazine in accordance with claim 1 including a block member insertable into and retained in said casing by said first cover means for maintaining said reel in a freely rotatable relation with said rolls.

4. A magazine in accordance with claim 3 wherein said block member is provided with an arcuate cut-out portion, the surface of which extends around at least 180° of the peripheral edges of the flanges of said reel.

5. A magazine in accordance with claim 4 wherein the size of said cut-out portion is in accordance with the diameter of the reel insertable in said casing.

6. A magazine in accordance with claim 4 wherein said block member is provided with an extension for locating said cut-out portion relative to said rolls, thereby providing a cavity within which said reel is freely rotatable.

7. A magazine in accordance with claim 2 wherein said supporting means for said cassette comprises a recess in the inner surface of each side wall, conforming generally in size and shape to said cassette and located so as to position the strip of film contained therein relative to said first slot for withdrawal therethrough.

8. A magazine in accordance with claim 7 wherein each of said recesses extends to said open end to permit insertion of said cassette into said casing.

9. A magazine in accordance with claim 2 wherein said supporting means for said cassette comprises an L-shaped plate secured to the inner surface of each side wall and cooperating with said one end wall to form a recess extending to said open end to permit insertion of said cassette into said casing.

10. A magazine in accordance with claim 2 wherein said plurality of rolls comprises a pair of spaced rolls rotatably mounted between said side walls within said casing and adjacent said other wall and said second slot.

11. A magazine in accordance with claim 1 including means arranged within said casing and adjacent said withdrawal slot for guiding the strip of film therethrough.

12. A magazine in accordance with claim 2 including guide means comprising a first roll rotatably mounted between said side walls adjacent said other wall and forming one edge of said second slot in said one end wall and a second roll rotatably mounted in said second cover means and engaging said first roll when said second cover means is in said overlying position.

13. A magazine in accordance with claim 12 wherein said first roll is provided with axially spaced shoulders for edge guiding the strip of film and said second roll is provided with a resilient surface for holding the strip of film in engagement with said first roll.

14. A magazine in accordance with claim 1 and including means arranged on the outer face of said other wall for supporting said magazine in a dispensing position relative to said film handling device.

* * * * *